US008023729B2

(12) United States Patent
Nelson

(10) Patent No.: US 8,023,729 B2
(45) Date of Patent: Sep. 20, 2011

(54) APPARATUS AND METHOD OF REDUCING COLOR SMEARING ARTIFACTS IN A LOW RESOLUTION PICTURE

(75) Inventor: Craig H. Nelson, Hillsboro, OR (US)

(73) Assignee: Tektronix, Inc., Beaverton, OR (US)

( * ) Notice: Subject to any disclaimer, the term of this patent is extended or adjusted under 35 U.S.C. 154(b) by 817 days.

(21) Appl. No.: 11/833,103

(22) Filed: Aug. 2, 2007

(65) Prior Publication Data

US 2008/0031519 A1 Feb. 7, 2008

Related U.S. Application Data

(60) Provisional application No. 60/835,585, filed on Aug. 3, 2006.

(51) Int. Cl.
*G06K 9/00* (2006.01)
(52) U.S. Cl. ........................................ 382/166
(58) Field of Classification Search .................. 382/166, 382/232–233; 348/441, 445, 448, 458; 375/240.21; 358/539; 345/603
See application file for complete search history.

(56) References Cited

U.S. PATENT DOCUMENTS

| 5,835,627 | A  * | 11/1998 | Higgins et al. | 382/167 |
|---|---|---|---|---|
| 6,175,592 | B1 * | 1/2001 | Kim et al. | 375/240.16 |
| 6,539,120 | B1 * | 3/2003 | Sita et al. | 382/233 |
| 6,788,347 | B1 * | 9/2004 | Kim et al. | 348/441 |
| 7,656,950 | B2 * | 2/2010 | Garrido et al. | 375/240.11 |
| 7,715,477 | B2 * | 5/2010 | Garrido et al. | 375/240.11 |

* cited by examiner

*Primary Examiner* — Jose Couso
(74) *Attorney, Agent, or Firm* — Thomas F. Lenihan; Francis I. Gray

(57) ABSTRACT

A method of reducing color smearing or color artifacts in a low resolution picture that is subjected to chrominance downsampling prior to display on a display device first upsamples the pixels in each row of the picture to double the picture width, then downsamples the chrominance values to produce a compressed data stream for transmission to the display device, and finally decompresses the compressed data stream for display. In order to maintain the aspect ration of the original picture, each doubled row may be repeated prior to transmission to the display device.

7 Claims, 4 Drawing Sheets

APPARATUS AND METHOD OF REDUCING COLOR SMEARING ARTIFACTS IN A LOW RESOLUTION PICTURE

CROSS REFERENCE TO RELATED APPLICATIONS

The present application claims the benefit of the filing date of provisional U.S. Patent Application No. 60/835,585, filed Aug. 3, 2006 entitled "Method for Reducing Color Smearing Artifact in a Low Resolution Picture Which Uses the Exif/JPEG Format", the contents of which are herein incorporated by reference.

FIELD OF THE INVENTION

The present invention relates to the display of data that has been compressed by a lossy algorithm, and more particularly to a method of reducing color smearing artifacts in a low resolution picture which has been compressed by a lossy algorithm when the picture is subsequently uncompressed for display.

BACKGROUND OF THE INVENTION

Some display standards require the display of data in a compressed format. For example the PictBridge standard from the Camera & Imaging Products Association (CIPA) allows images to be printed directly from digital cameras to a printer without having to connect the camera to a computer. Such printers currently must conform to at least the Exif/JPEG standard so that products from various vendors are compatible with each other. In the test and measurement field, it is often desired to print out the image that appears on an instrument screen, wherein the screen image represents acquired data. Therefore, it is desirable that the output which is to be printed from the instrument be in a format that is acceptable by printers which conform to the PictBridge standard. That is, the image data should be in the Exif/JPEG format, which requires either 4:2:2 or 4:2:0 chrominance downsampling.

When the original data comes from a low resolution source, such as an oscilloscope screen (typically 320×240, a "quarter VGA" display), reconstruction of the data from the lossy compressed format may cause color distortion or smearing, leading to an improper interpretation of the original data. Using JPEG as an example, the data from the low resolution source is in the form of pixels, each pixel having a luminance value (Y) and a pair of chrominance values (U,V). Where all three values are given for each pixel, the format is referred to as being in a 4:4:4 format. However it is often desired to compress these pixels for transmission or storage, and then later decompress them for display. The Exif2.1 JPEG format specifies that either 4:2:2 or 4:2:0 chrominance downsampling be used for storage and transmission of the original JPEG image data. Chrominance downsampling is specified because the human eye is less sensitive to chrominance variations than to luminance variations.

An example of chrominance downsampling is the following conversion of the first four pixels of a display line:

$\{4:4:4\}$ $[Y_0 U_0 V_0][Y_1 U_1 V_1][Y_2 U_2 V_2][Y_3 U_3 V_3]$
$\{4:2:2\}$ $[Y_0 U_0]$ $[Y_1 V_1]$ $[Y_2 U_2]$ $[Y_3 V_3]$

When a printer, for example, converts the 4:2:2 bit stream back into viewable pixels having luminance and both chrominance components $\{4:4:4\}$, the following pixels are produced:

$[Y_0 U_0 V_1][Y_1 U_0 V_1][Y_2 U_2 V_3][Y_3 U_2 V_3]$

As is apparent, the chrominance components of the decompressed pixels are not identical to those of the original pixels, i.e., $U_0 V_0 \neq U_0 V_1$ for the first pixel. This discrepancy occurs because neighboring pairs of compressed pixels are used to reconstruct the decompressed pixels. Within each pair of reconstructed pixels $[Y_0 U_0 V_1][Y_1 U_0 V_1]$ or $[Y_2 U_2 V_3][Y_3 U_2 V_3]$, is actually sharing a chrominance value from its neighboring pixel. That is, first reconstructed pixel (with luminance value $Y_0$) is using the $V_1$ chrominance value copied from its neighbor on the right, while the second reconstructed pixel (with luminance value $Y_1$) is using the $U_0$ chrominance value copied from its neighbor on the left. This reconstructed pattern is repeated for each pair of adjacent pixels.

Referring to FIG. 1a, a low resolution pixel row is shown with original data that has a solid color transition between pixels 2 and 3. In a low resolution rendering, when recreated after JPEG compression and decompression, this may show up as color smearing or color artifacts, as shown in FIG. 1b, since the original pixels have been approximated for the reconstruction due to the lossy nature of the JPEG compression. In particular pixel pairs 2/3 and 12/13, when recreated, show color artifacts along edges of regions of solid color, where the color artifacts may be of a completely different color than in the original pixel colors. Such artifacts occur when the color transition occurs between pixels in a pixel pair. What is desired is an apparatus and method of formatting the compressed data such that reconstructing the original low resolution picture from a lossy compressed version occurs without chrominance compression induced color smearing or color artifacts.

SUMMARY OF THE INVENTION

Accordingly, the present invention provides a method of reducing chrominance compression induced color smearing artifacts in a low resolution picture which uses a compressed format, such as the Exif/JPEG format, for display. The low resolution JPEG picture is upsampled to double the number of pixels in each row. Then, the chrominance values are downsampled conventionally so that each pixel pair includes the luminance value and one of the chrominance values from the original doubled pixel to produce a compressed data stream. To maintain the aspect ratio, each line of the picture also is doubled, either before or after the chrominance downsampling. The compressed data stream is then transmitted to a display device, such as a printer, and decompressed to substantially recreate the original picture.

The objects, advantages and other novel features of the present invention are apparent from the following detailed description when read in conjunction with the accompanying claims and attached drawing.

DETAILED DESCRIPTION OF THE EMBODIMENTS

The subject invention will be described, at first, with reference to FIGS. 1a, 2a, 2b, and 3, taken together. FIG. 3 shows a digital storage oscilloscope suitable for use with the subject invention. One skilled in the art will realize that the screen image data (i.e. picture data) stored in Rasterizer Memory 330 or Raster Scan Memory 314, may be stored in a format that is proprietary to the manufacturer of the oscilloscope. Therefore, the stored screen image data is first converted by application of the JPEG transforming (or translating) software into a standard JPEG image. It is noted that this transformation process is, itself, a form of compression, is somewhat lossy, and contributes a small measure of color smearing. The JPEG algorithm is controlled by a "quality" variable which controls the amount of compression. It is recommended to use a high enough value of quality such that the color smearing of the output JPEG image is barely detectable on devices used to display the JPEG picture. The result of this JPEG transformation of the screen image data is stored in memory in the form shown in FIG. 1a.

Figure 1:
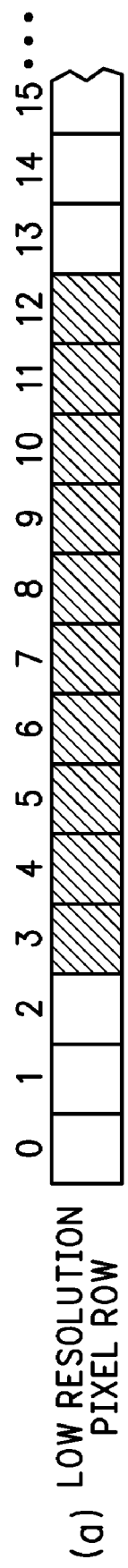
FIG. 1a is an illustrative view of a row of pixels for a picture prior to chrominance downsampling as known from the prior art.
FIG. 1b is an illustrative view of a recreated row of the picture showing smearing as known from the prior art.
Figure 1:
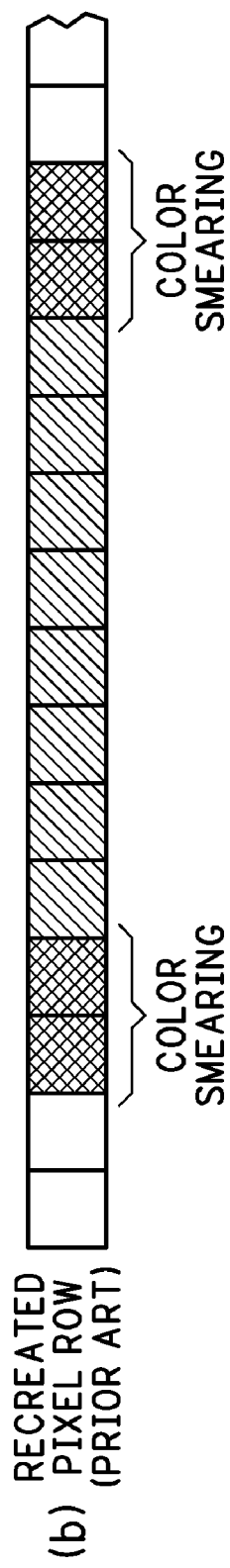
Figure 2:
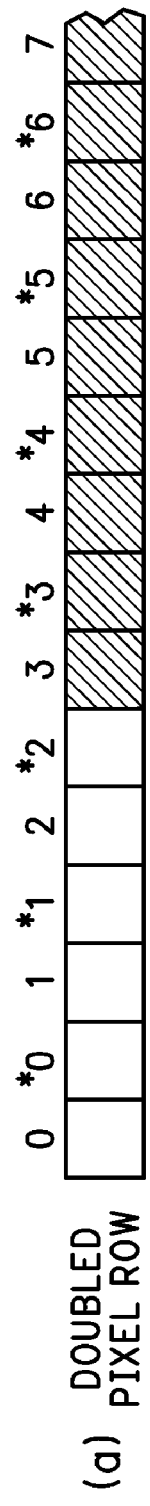
FIG. 2a is an illustrative view of a row of upsampled pixels prior to chrominance downsampling in accordance with the subject invention.
FIG. 2b is an illustrative view of a recreated row of the upsampled picture according to the subject invention.
Figure 2:
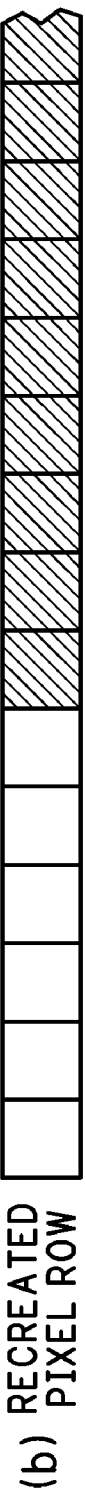
Figure 3:
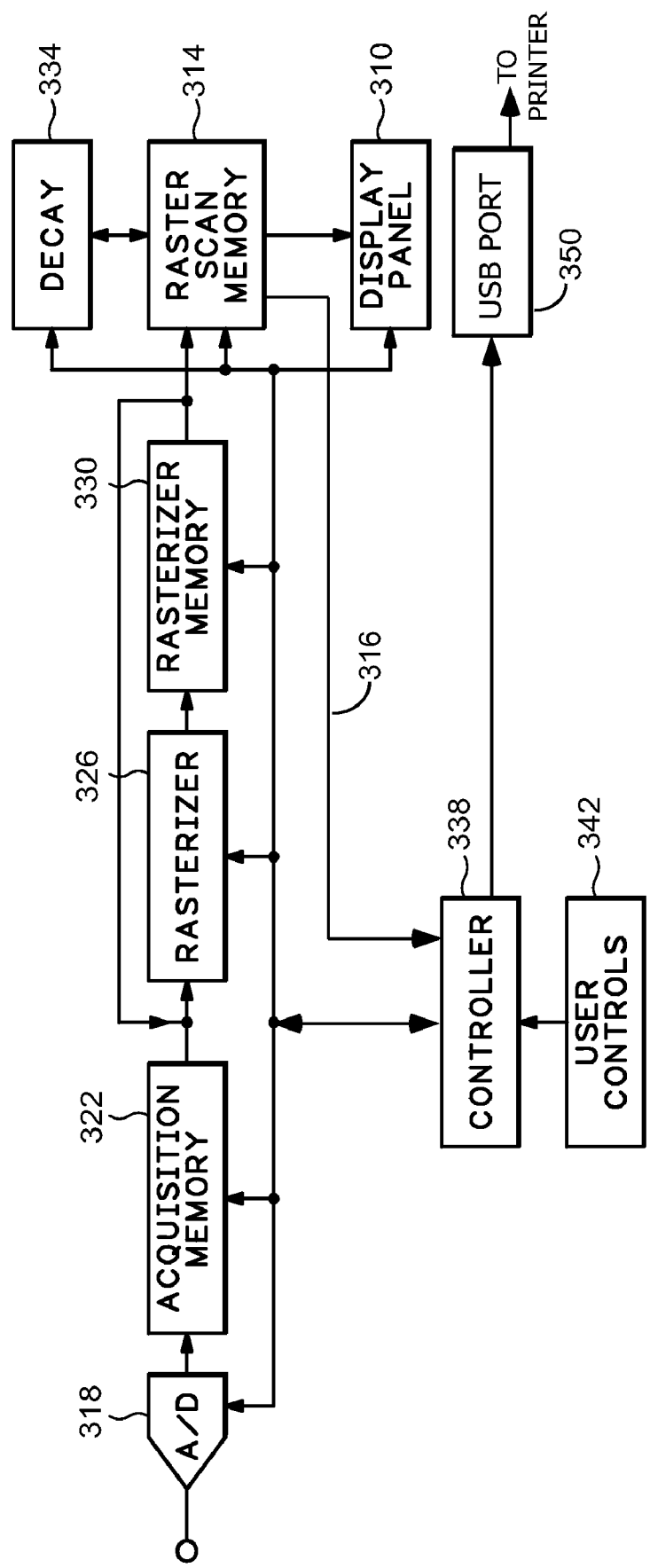
FIG. 3 is a high level block diagram of a digital storage oscilloscope suitable for use with the invention.

FIGS. 2a and 2b show the first few pixels of a doubled pixel row of the converted JPEG image data in accordance with the subject invention. As shown in FIG. 2a, in order to print a low resolution oscilloscope screen image on a printer connected to the oscilloscope, without experiencing the above-described chrominance compression induced color smearing, each row of the low resolution image is upsampled. That is, each pixel in each row of the original JPEG-transformed low resolution image is repeated to make each row of the doubled pixel row of FIG. 2a, twice as long. This procedure doubles the number of columns in the picture. For the first three pixels of a row this procedure produces:

$[Y_0U_0V_0][*Y_0*U_0*V_0][Y_1U_1V_i][*Y_1*U_1*V_1][Y_2U_2V_2][*Y_2*U_2*V_2]$ ... (where $*X_n=X_n$)

The data representing the JPEG-transformed and doubled pixel elements of FIGS. 2a and 2b may be stored, for example, in a reserved portion of acquisition memory 322 or in a portion of memory associated with controller 338 of the oscilloscope of FIG. 3, or in a separate memory (not shown for simplicity).

Applying the 4:2:2 downsampling scheme (which is easier to implement than the 4:2:0 downsampling scheme), produces the following compressed data stream for transmission or storage:

$[Y_0U_0] [*Y_0*V_0] [Y_1U_1] [*Y_1*V_1] [Y_2U_2] [*Y_2*V_2]$

When the pixels are reconstructed (for example by a printer) the following pixel values are derived:

$[Y_0U_0*V_0][*Y_0U_0*V_0][Y_1U_1*V_1][*Y_1U_1*V_1]$
$[Y_2U_2*V_2][*Y_2U_2*V_2]$

As shown in FIG. 2b, this produces a reconstructed picture that is twice as wide, but contains no color smearing artifacts, because $*X_n=X_n$. That is, the smearing of chrominance values between adjacent pairs of pixels is prevented by causing identical values to be shared in adjacent pixel pairs. In other words, each pixel pair has the same luminance and chrominance values as in the original JPEG-formatted picture before the more lossy 4:2:2 (or 4:2:0) chrominance compression is applied.

To achieve the same aspect ratio in the reconstructed image, as was exhibited by the original JPEG-formatted picture, there are two options—(i) decimate the pixels after the reconstruction to produce the original picture or (ii) send each compressed row twice so that the number of rows is also doubled. As noted above, doubling both the row width and the number of rows converts the "quarter VGA" image to a full VGA image that is easily handled by the attached printer. In fact, many display devices, such as printers, only provide for decompression for display, so the second option is preferable. Although this might appear to produce aliasing or "jaggies" (step-like transitions for edges that are slanted in the picture), most display devices are of a higher resolution than the low resolution picture and include algorithms to reduce such "jaggies". In practice, the doubled row and column "size" of the Exif/JPEG is seldom used by printers, which either re-size the picture to the paper size or to the user's picture size selection from the printer side.

Referring again to FIG. 3, an otherwise conventional raster scan digital oscilloscope includes a controller 338 that is programmed to execute the steps of the above described method. The oscilloscope also includes a display panel 310 having a two-dimensional array of pixels, with each pixel location being uniquely defined by a row number and a column number. The oscilloscope also includes a raster scan memory 314 having a two-dimensional address space. The memory locations in the raster scan memory map on a one-to-one basis with the pixel locations of the display panel 310. The state of each pixel depends on the contents of the corresponding memory location in the raster scan memory 314. A signal line 316 conveys rasterized screen image data from raster scan memory 314 to controller 338, so that controller 338 can convert the rasterized screen image data to JPEG-transformed screen image data in a 4:4:4 format, before compression to 4:2:2 format. One skilled in the art will realize that line 316 is not required to be a separate signal line, and instead, the screen image data may, in fact, be conveyed via a bus. The oscilloscope of FIG. 3 also includes a USB port 350, or other known form of communications port, for conveying the JPEG-transformed and compressed 4:2:2 formatted screen image data from the oscilloscope to an attached display device or printer (not shown for simplicity).

In the case of the oscilloscope shown in FIG. 3, the raster scan memory stores n bits of information for each pixel, where n is an integer greater than one, which allows each pixel to have $2^n$ illumination states. One of the states is off, and in each of the other $2^{n-1}$ states, the pixel is illuminated at a different respective intensity. Thus, for example, a 4-bit deep raster scan memory can support fifteen levels of partial to maximum illumination (gray scale levels) as well as the dark or off state.

The digital oscilloscope shown in FIG. 3 also includes an A/D converter 318 having an input terminal for acquiring an electrical signal at a test point in an electronic circuit. A/D converter 318 samples the signal during an acquisition interval and quantizes the samples to generate a sequence of digital data words. The data words generated by A/D converter 318 and having values $D_1$-$D_N$ are stored as a linear waveform record in an acquisition memory 322 having a one-dimensional address space $A_1$-$A_N$.

When the acquisition is complete, the linear waveform record stored in acquisition memory 322 is supplied to a rasterizer 326 which generates a rasterized waveform record and stores it in a rasterizer memory 330 having a two-dimensional address space $(X_1$-$X_N, Y_1$-$Y_N)$ for display on display panel 310.

In a practical application, an oscilloscope display panel 310 may have 320 pixel rows by 240 pixel columns, known as a "quarter VGA" format. By doubling both the rows and columns, as described above, a full VGA format is achieved for the display device. In this way, instrument screen images may be compressed, doubled, and outputted to printers directly, without any chrominance compression induced color smearing or color artifacts appearing after reconstruction of the image.

Figure 4:
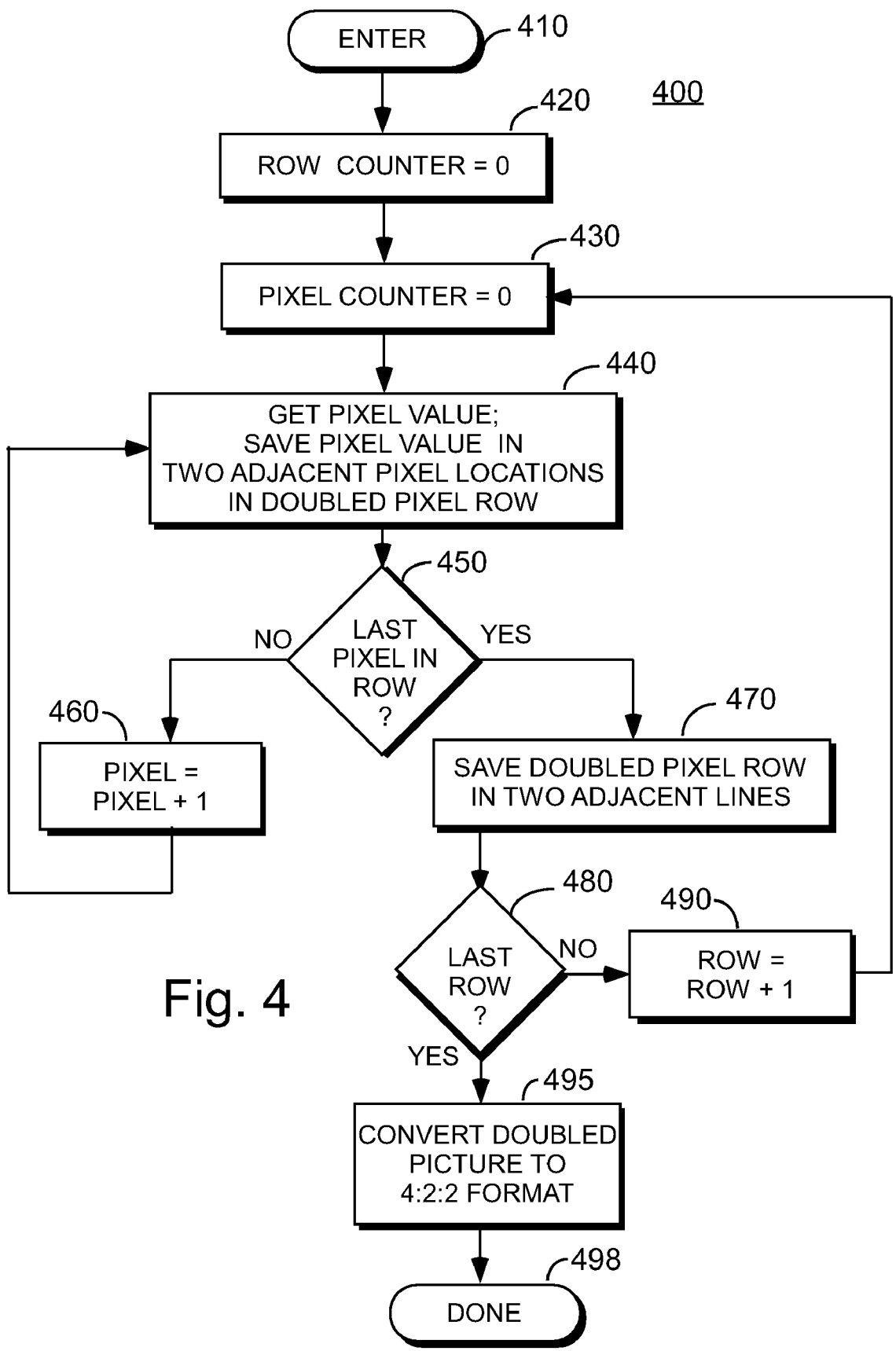
FIG. 4 is a flowchart useful for understanding the invention.

The pixel and line doubling method described above is illustrated in the flowchart of FIG. 4. The method, generally designated, 400 is entered at step 410 in which the 4:4:4 formatted original JPEG image has already been created by controller 338 (in a known manner) from the waveform image stored in raster scan memory 314.

At steps 420 and 430 respectively, a row "counter" and a pixel "counter" are reset to zero to point to the first pixel of the first row of the 4:4:4 formatted data. The "counters" of steps 420 and 430 may be registers, or memory locations, or may simply be pointers to memory arrays within controller 338. At step 440, controller 338 causes a fetch of the pixel data currently addressed via the pixel counter, and stores that data in two adjacent pixel locations in a memory array in which the doubled pixel rows are stored. At step 450, a check is made to see if the last pixel in the current row has been processed. If not, the NO path is taken to step 460 where the pixel counter is incremented to point to the next pixel to be processed. The routine then loops back to step 440 to double store the next pixel. If at step 450, all pixels in the current row have been processed, then the YES path is taken to step 470 at which the entire contents of the current doubled pixel row are stored again in the next adjacent row, thus doubling in the vertical direction as well. Thereafter, at step 480 a check is made to see if all rows of the original 4:4:4: formatted data have been processed. If not, the NO path is taken to step 490 where the row counter is incremented, and the program then loops back to step 430 where the pixel counter is re-initialized to point to the first pixel of the next row. If, at step 480, it was determined that all rows had been processed, then the routine would advance to step 495 where 4:4:2 compression is performed on the doubled pixels in the doubled rows. Although 4:4:2 format is preferred, one skilled in the art will realize that the 4:4:4 formatted data could be converted instead to 4:2:0 format at step 495. The routine is then exited at step 498. Thereafter, the data can be transmitted to an external display device or printer for reconstruction of the image.

Figure 5:
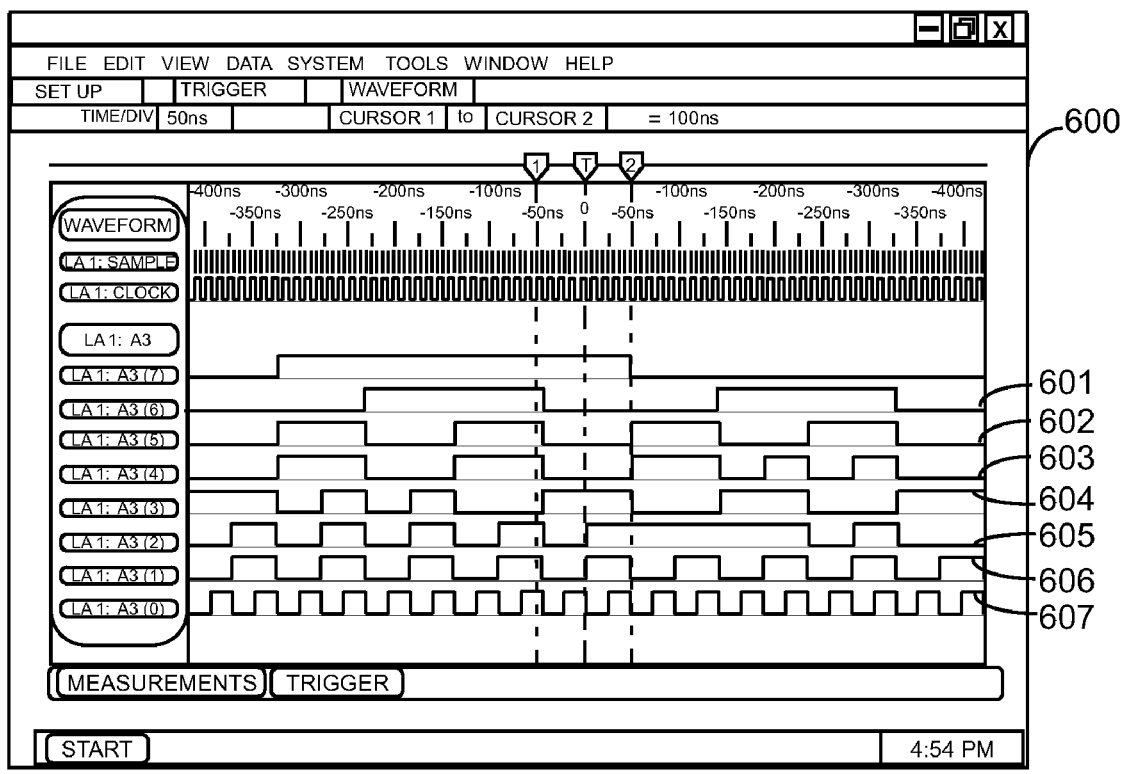
FIG. 5 is an illustration of a typical low resolution screen image of digital storage oscilloscope.

FIG. 5 shows a typical low resolution screen image of an oscilloscope. Advantageously, color artifacts produced by reconstruction of chrominance compressed JPEG image data according to the prior art are prevented from occurring by use the subject invention. Such artifacts would be readily observable in the reconstructed low resolution JPEG image.

Figure 6:
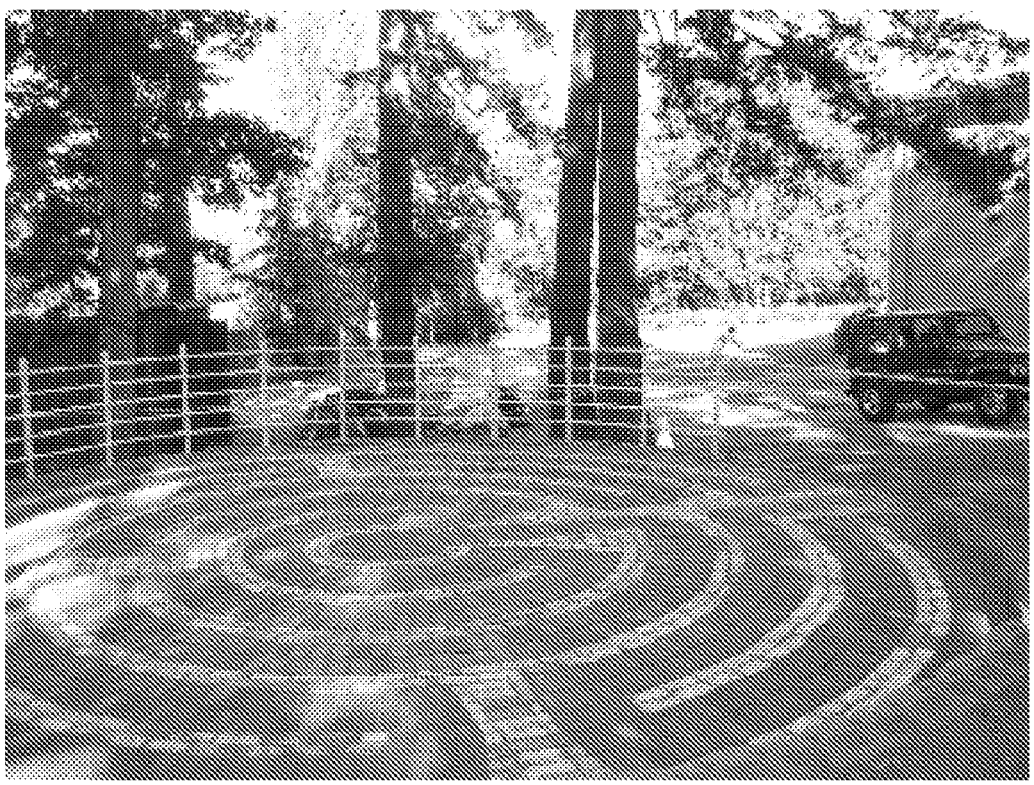
FIG. 6 is an example of a digital photograph having higher resolution than the screen image of FIG. 5.

Original JPEG pictures having full VGA or XVGA resolutions, such as the picture shown in FIG. 6 may not have as much color smearing even without using the above-described method. Such images have much more detail, and color artifacts are not as easily detected in the greater detail. Such a picture is shown in FIG. 6, by way of comparison with the low resolution oscilloscope display image of FIG. 5. However, full VGA or XVGA pictures which contain precise detail, and which must use chrominance downsampling, also benefit from using this method.

In a second embodiment of the invention, the pixel and row doubling operation is performed on the original (or "native") screen image data, stored in the format used by the manufacturer of the test and measurement instrument. That is, the pixel and row data are doubled before JPEG translation of the data is performed. Thereafter, the JPEG chrominance compression (i.e., downsampling) algorithm operates on 8 pixel by 8 pixel blocks of the JPEG-transformed data. It should be noted that, because of the pixel and row doubling, only 16 unique source pixels are presented within each 8 by 8 block. The JPEG chrominance compression (i.e., downsampling) algorithm operates on 8 rows of data at a time, processing 40 blocks of pixels to complete each group of 8 rows.

During implementation of the row and column doubling feature, it was realized that a number of calculations within the JPEG chrominance compression algorithm could be skipped because the subtraction of luminance or chrominance values of certain pixels within the 8 by 8 block always yields zero. Multiplications employing this zero difference as a multiplier or multiplicand can also be skipped because the product would also equal zero.

Thus, the present invention provides a method of reducing color smearing when using lossy compression, such as chrominance downsampling, by upsampling or doubling each pixel in each row of an original picture, and compressing the resulting doubled rows, before transmitting the image to an external display device or printer for decompression of the doubled rows for display or printing.

What is claimed is:

1. A method of reducing chrominance compression induced smearing in a JPEG picture stored in a memory using a controller, the JPEG picture representing a low resolution image, having pixels arranged in rows and columns that define an aspect ratio, where each pixel has a luminance value and two chrominance values, comprising the steps of:

upsampling the pixels of the JPEG picture from the memory to double the number of pixels in each row to produce an upsampled data stream;

downsampling the chrominance values in the upsampled data stream so each pixel pair includes the luminance value and a respective one of the chrominance values from a corresponding pixel of the JPEG picture to produce a compressed data stream; and transmitting the compressed data stream to a display device for display.

2. The method of claim 1 further comprising the step of:
doubling each row of the upsampled data stream prior to the transmitting step to restore the aspect ratio of the JPEG picture when displayed by the display device.

3. The method of claim 2, wherein said row doubling step occurs after the downsampling step.

4. The method of claim 1, further including the step of:
decompressing the compressed data stream in the display device to recreate the upsampled data stream for display by the display device.

5. A digital storage oscilloscope, comprising:
acquisition circuitry having an input at which is receive an input signal to be acquired;
a memory coupled to said acquisition circuitry;
the acquisition circuitry digitizing the input signal and storing data samples representative of the input signal in said memory;
a rasterizer receiving the acquired data samples and producing rasterized data for display;
display circuitry receiving the rasterized data and displaying a low resolution image representing the input signal;
a controller controlling the acquisition circuitry, the memory, the rasterizer and the display; and
a communication port coupled to said controller;
said controller operating on the samples representative of the input signal to produce original JPEG image data in a 4:4:4 format;

said controller doubling each pixel of each row of the 4:4:4 formatted data to form a doubled row of pixels, the doubled row being twice as wide as the corresponding row of the original JPEG image data;

said controller storing each doubled row of pixels on two adjacent lines to double the image size in the vertical direction;

said controller compressing said doubled rows of pixel data according to a 4:2:2 compression scheme;

said controller transmitting the 4:2:2 formatted compressed data via said communications port.

6. The digital storage oscilloscope of claim 5 wherein said communications port is a USB port.

7. The digital storage oscilloscope of claim 6, wherein:

a printer is connected to said communications port, said printer decompressing said 4:2:2 formatted data and printing an image representing said low resolution image.

* * * * *